United States Patent
Transier et al.

(10) Patent No.: US 10,621,153 B2
(45) Date of Patent: Apr. 14, 2020

(54) PREVIEW DATA AGGREGATION

(71) Applicant: SAP SE, Walldorf (DE)

(72) Inventors: Frederik Transier, Heidelberg (DE); Kai Stammerjohann, Wiesloch (DE); Nico Bohnsack, Walldorf (DE)

(73) Assignee: SAP SE, Walldorf (DE)

( * ) Notice: Subject to any disclaimer, the term of this patent is extended or adjusted under 35 U.S.C. 154(b) by 304 days.

(21) Appl. No.: 15/596,954

(22) Filed: May 16, 2017

(65) Prior Publication Data

US 2018/0336230 A1    Nov. 22, 2018

(51) Int. Cl.
*G06F 16/22* (2019.01)
*G06F 16/2455* (2019.01)
*G06F 16/28* (2019.01)

(52) U.S. Cl.
CPC ........ *G06F 16/22* (2019.01); *G06F 16/24556* (2019.01); *G06F 16/24561* (2019.01); *G06F 16/285* (2019.01); *G06F 16/287* (2019.01)

(58) Field of Classification Search
CPC .............. G06F 16/22; G06F 16/1858; G06F 16/24532; G06F 16/278; G06F 16/27; G06F 16/244; G06F 16/24556; G06F 16/24561; G06F 16/287; G06F 16/285; Y10S 707/968; Y10S 707/97; Y10S 707/972; Y10S 707/973; Y10S 707/974
See application file for complete search history.

(56) References Cited

U.S. PATENT DOCUMENTS

| | | | | |
|---|---|---|---|---|
| 5,655,080 A | * | 8/1997 | Dias | G06F 9/5027 709/202 |
| 2011/0055243 A1 | * | 3/2011 | Kunnummal | G06F 16/9535 707/769 |
| 2012/0047125 A1 | * | 2/2012 | Day | G06F 16/24542 707/714 |
| 2012/0089642 A1 | * | 4/2012 | Milward | G06F 16/313 707/776 |
| 2012/0311581 A1 | * | 12/2012 | Balmin | G06F 9/5066 718/100 |
| 2014/0156636 A1 | * | 6/2014 | Bellamkonda | G06F 16/24556 707/718 |
| 2015/0269228 A1 | * | 9/2015 | Fisher | G06F 16/285 707/722 |
| 2018/0218045 A1 | * | 8/2018 | Pal | G06F 16/24564 |

* cited by examiner

*Primary Examiner* — David T. Brooks
(74) *Attorney, Agent, or Firm* — Mintz Levin Cohn Ferris Glovsky and Popeo, P.C.

(57) ABSTRACT

In one respect, there is provided a method. The method can include processing a first data chunk to generate a first intermediate result. A key map can be generated based on a determination that a quantity of the key-value pairs in the first intermediate result exceeds a threshold. The key map can be generated to include keys in the first intermediate result. A second data chunk can be processed to generate a second intermediate result. The second data chunk can be processed based on the key map. The processing of the second data chunk can include omitting a key-value pair in the second data chunk from being inserted into the second intermediate result based on a key associated with the key-value pair being absent from the key map. A preview of the processing of the dataset can be generated based on the first intermediate result and the second intermediate result.

14 Claims, 8 Drawing Sheets

PREVIEW DATA AGGREGATION

FIELD

The present disclosure generally relates to distributed computing and, more specifically, to the aggregation of preview data from multiple computing nodes.

BACKGROUND

To leverage the multi-core architecture of a distributed computing system, a large dataset can be partitioned into data chunks for parallel processing at different nodes. The final results for processing the entire dataset can be formed by merging the intermediate results obtained at the individual nodes. Meanwhile, a preview of these final results can include a subset of the final results.

SUMMARY

Methods, systems, and articles of manufacture, including computer program products, are provided for clustering tables. In some implementations of the current subject matter, there is provided a computer-implemented method. The method can include: processing, at a first worker node, a first data chunk of a dataset to generate a first intermediate result, the processing of the first data chunk comprising inserting key-value pairs from the first data chunk into the first intermediate result, the dataset being partitioned into the first data chunk and a second data chunk; generating, at a merger node, a key map based at least on a determination that a quantity of the key-value pairs in the first intermediate result exceeds a threshold value, the key map being generated to include one or more keys of the key-value pairs in the first intermediate result; and processing, at a second worker node, the second data chunk to generate a second intermediate result, the second data chunk being processed based at least on the key map, the processing of the second data chunk comprising omitting a key-value pair in the second data chunk from being inserted into the second intermediate result, the key-value pair being omitted based on a key associated with the key-value pair being absent from the key map; and generating a preview of the processing of the dataset, the preview being generated based at least on the first intermediate result and the second intermediate result.

In some variations, one or more of the features disclosed herein including the following features can optionally be included in any feasible combination. The processing of the second data chunk can further include inserting, into the second intermediate result, another key-value pair from the second data chunk, the other key-value pair being inserted based on another key associated with the other key-value pair being present in the key map. The threshold value can correspond to a quantity of key-value pairs required to be present in the preview.

In some variations, the inserting of the key-value pairs from the first data chunk into the first intermediate result can include: selecting a first key-value pair from the first data chunk; and determining whether the first key-value pair is associated with a same key as a second key-value pair in the first intermediate result. The first key-value pair and the second key-value pair can be aggregated based at least in part on a determination that the first key-value pair and the second key-value pair are associated with the same key. The aggregating can include aggregating a first value of the first key-value pair and a second value of the second key-value pair, the first value and the second value being aggregated by addition, multiplication, division, subtraction, and/or comparison.

In some variations, the preview can be generated by at least merging the first intermediate result and the second intermediate result. The first intermediate result and the second intermediate result can be merged by at least identifying at least one key-value pair from the first intermediate result that share a same key as another key-value pair from the second intermediate result. The preview can be further generated by merging a third intermediate result with the first intermediate result and/or the second intermediate result, the third intermediate result being generated based on the key map. In response to determining that the third intermediate result is generated based on the key map, the third intermediate result can be merged without identifying at least one key-value pair from the third intermediate result that share a same key as another key-value pair from the first intermediate result and/or the second intermediate result.

It is to be understood that both the foregoing general description and the following detailed description are exemplary and explanatory only and are not restrictive. Further features and/or variations can be provided in addition to those set forth herein. For example, the implementations described herein can be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
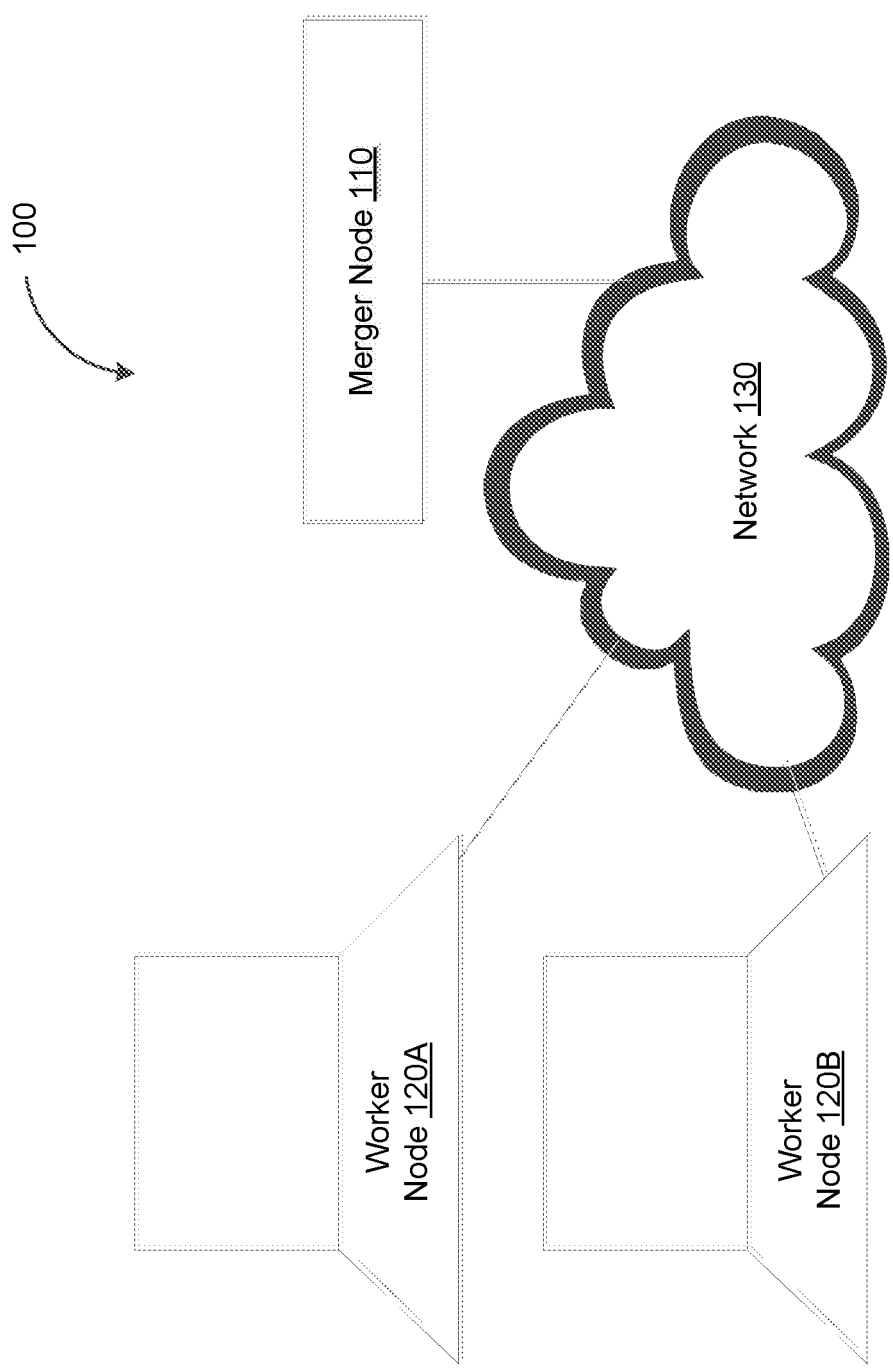
FIG. 1 depicts a system diagram illustrating a distributed computing system consistent with implementations of the current subject matter.

Like labels are used to refer to same or similar items in the drawings.

DETAILED DESCRIPTION

A preview of the final results for processing a dataset across multiple nodes in a distributed computing system can include only a subset of these final results. Nevertheless, a preview is typically generated based on the full set of final results. As such, generating the preview can still require aggregating and merging all of the intermediate results in order to form the final results, even though only a portion of these final results is subsequently included in the preview. This aggregation and merging of all of intermediate results can impose a significant amount of computation and communication overhead.

A dataset can be partitioned into a plurality of data chunks. The partitioning of the dataset can include generating a plurality of key-value pairs and assigning the key-value pairs to the plurality of data chunks. For example, the same key can be mapped to several different values while the resulting key-value pairs can be assigned to the same or different data chunks. A plurality of worker nodes can be configured to generate intermediate results by at least aggregating key-value pairs from the plurality of data chunks. For instance, one worker node can aggregate key-value pairs from one data chunk to form one intermediate result while another worker node can aggregate key-value pairs from another data chunk to form another intermediate result. Key-value pairs from a data chunk can be aggregated by at least matching the keys that are present in each key-value pair. Thus, two key-value pairs with the same key can be aggregated into a single key-value pair to form an intermediate result. Meanwhile, one or more merger nodes can be configured to determine a final result by at least merging the intermediate results generated by the worker nodes. In some implementations of the current subject matter, key-value pairs from the intermediate results can be merged by at least matching the keys that are present in each key-value pair. Accordingly, two key-value pairs with the same key can be further aggregated into a single key-value pair to form the final results.

As noted earlier, a preview of the final results can include a subset of the final results. Thus, in some implementations of the current subject matter, the preview can be generated by aggregating and merging only some of the key-value pairs from the final results. For instance, a merger node can be configured to generate a key map that includes some but not all of the keys from the key-value pairs formed from partitioning the dataset. The worker nodes can subsequently aggregate key-value pairs from different data chunks based on the key map. For example, a worker node can include a key-value pair in an intermediate result when the key associated with that key-value pair is present in the key map. By contrast, the worker node can exclude a key-value pair from the intermediate result when the key associated with the key value pair is not present in the key map. It should be appreciated that applying the key map prevents the aggregating and the merging of key-value pairs not included in the preview, thereby reducing the computation and communication overhead associated with generating the preview. Furthermore, applying the key map can impose the same order to the key-value pairs included in different intermediate results. As such, these intermediate results can be merged without matching the keys present in each key-value pair.

FIG. 1 depicts a system diagram illustrating a distributed computing system 100 consistent with implementations of the current subject matter. Referring to FIG. 1, the distributed computing system 100 can include a plurality of merger nodes including, for example, a merger node 110. The distributed computing system 100 can further include a plurality of worker nodes including, for example, a first worker node 120A and a second worker node 120B. The merger node 110, the first worker node 120A, and the second worker node 120B can be communicatively coupled via a wired and/or wireless network 130. The wired and/or wireless network 130 can be a wide area network (WAN), a local area network (LAN), and/or the Internet. It should be appreciated that the distributed computing system 100 can include additional merger nodes and/or worker nodes than shown. Moreover, instead of the physically distinct nodes shown in FIG. 1, the merger node 110, the first worker node 120A, and/or the second worker node 120B can be implemented as separate threads run on different processors and/or processor cores within the same computing platform. As used herein, a node (e.g., the merger node 110, the first worker node 120A, and/or the second worker node 120B) can refer to any computing unit having at least one processor coupled to a memory storing instructions.

The first worker node 120A and the second worker node 120B can be configured to parallel process different data chunks from a single dataset. In doing so, the first worker node 120A and the second worker node 120B can each generate an intermediate result. The merger node 110 can subsequently merge the intermediate results generated by each of the first worker node 120A and the second worker node 120B to form a final result of the parallel processing. In some implementations of the current subject matter, a preview of the final results can include a subset of the final results. For example, the preview of the final results can include a k number of key-value pairs from the final results whereas the final results can include an m number of key-value pairs. As such, the merger node 110 can generate a key map that includes a k number of keys. Key-value pairs having keys that are present in this key map can be aggregated and/or merged to form the preview. By contrast, key-value pairs having keys that are absent from the key map cannot be aggregated and/or merged to form the preview.

Figure 2A:
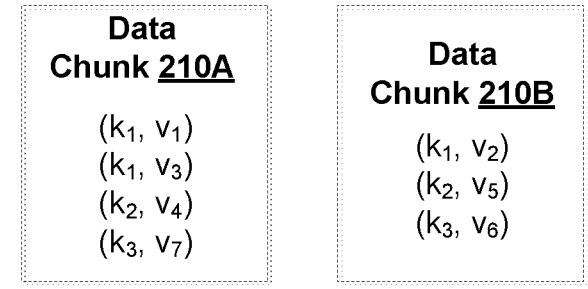
FIG. 2A depicts a first data chunk and a second data chunk consistent with implementations of the current subject matter.

To further illustrate, FIG. 2A depicts a first data chunk 210A and a second data chunk 210B consistent with implementations of the current subject matter. The first worker node 120A can process the first data chunk 210A by at least aggregating key-value pairs from the first data chunk 210A. Meanwhile, the second worker node 120B can process the second data chunk 210B by at least aggregating key-value pairs from the second data chunk 210B.

The first data chunk 210A and the second data chunk 210B can be formed by partitioning a dataset. For example, the dataset can be partitioned by applying, to the dataset, a hash function configured to generate a plurality of key-value pairs. It should be appreciated that applying the hash function can map multiple values from the dataset to the same key. Thus, a first key $k_1$ can be mapped to a first value $v_1$, a second value $v_2$, and a third value $v_3$ to form a first key-value pair $(k_1, v_1)$, a second key-value pair $(k_1, v_2)$, and a third key-value pair $(k_1, v_3)$. A second key $k_2$ can be mapped to a fourth value $v_4$ and a fifth value $v_5$ to form a fourth key value pair $(k_2, v_4)$ and a fifth key-value pair $(k_2, $v_5$). A third key $k_3$ can be mapped to a sixth value $v_6$ and a seventh value $v_7$ to form a sixth key-value pair $(k_3, v_6)$ and a seventh key-value pair $(k_3, v_7)$. As shown in FIG. 2A, the first data chunk 210A can include the first key-value pair $(k_1, v_1)$, the third key-value pair $(k_1, v_3)$, the fourth key-value pair $(k_2, v_4)$, and the seventh key-value pair $(k_3, v_7)$. The second data chunk 210B can include the second key-value pair $(k_1, v_2)$, the fifth key-value pair $(k_2, v_5)$, and the sixth key-value pair $(k_3, v_6)$.

Figures 2B, 2C:
FIG. 2B depicts an intermediate result consistent with implementations of the current subject matter.
FIG. 2C depicts a key map consistent with implementations of the current subject matter.

The first worker node 120A can process the first data chunk 210A, for example, by aggregating the first key-value pair $(k_1, v_1)$, the third key-value pair $(k_1, v_3)$, the fourth key-value pair $(k_2, v_4)$, and the seventh key-value pair $(k_3, v_7)$ to form a first intermediate result 220A shown in FIG. 2B. According to some implementations of the current subject matter, key-value pairs from the first data chunk 210A can be aggregated by at least matching the keys that are present in each key-value pair. A key-value pair can be added to the intermediate result 220 if the key associated with that key-value pair is not already present in the intermediate result. Alternately and/or additionally, a key-value pair can be aggregated with another key-value pair in the first intermediate result 220A if the two key-value pairs share a same key.

To further illustrate, the first worker node 120A can add the first key-value pair $(k_1, v_1)$ to the first intermediate result 220A if the first worker node 120A determines that the first key $k_1$ is not already present in the first intermediate result 220A. However, when the first worker node 120A attempts to add the third key-value pair $(k_1, v_3)$, the first worker node 120A can determine that the first key $k_1$ is already present in the first intermediate result 220A. As such, the first worker node 120A can aggregate the first key-value pair $(k_1, v_1)$ and the third key-value pair $(k_1, v_3)$ to form an eighth key-value pair $(k_1, v_{1,3})$, where the value $v_{1,3}$ can be formed by at least aggregating the first value $v_1$ and the third value $v_3$. For example, the first worker node 120A can aggregate the first value $v_1$ and the third value $v_3$ by applying one or more mathematical operations including, for example, addition, subtraction, multiplication, division, and comparison. Meanwhile, the first worker node 120A can add both the fourth key-value pair $(k_2, v_4)$, and the seventh key-value pair $(k_3, v_7)$ to the first intermediate result 220A as neither the second key $k_2$ nor the third key $k_3$ are present in the first intermediate result 220A.

In some implementations of the current subject matter, the merger node 110 can generate a preview by at least forming a key map based on the intermediate results from at least one worker node such as, for example, the first worker node 120A. This key map can then be applied by other worker nodes, such as the second worker node 120B, to limit the key-value pairs that are aggregated to form the intermediate results. For instance, the preview can include only two unique keys (e.g., k=2). As such, the merger node 110 can generate the key map as soon as the merger node 110 obtains, from the first worker node 120A, the first intermediate result 220A, which includes at least two unique keys.

FIG. 2C depicts a key map 230 consistent with implementations of the current subject matter. The merger node 110 can generate the key map 230 based on the first intermediate result 220A, which the merger node 110 can receive from the first worker node 120A. Thus, as shown in FIG. 2C, the merger node 110 can generate the key map 230 to include two different keys from the first intermediate result 220A such as, for example, the first key $k_1$ and the second key $k_2$. In some implementations of the current subject matter, the key map 230 can indicate the keys of the key-value pairs that are included in the preview, thereby obviating the aggregation of key-value pairs that do not match the keys present in the key map 230.

Figures 2D, 2E:
FIG. 2D depicts an intermediate result consistent with implementations of the current subject matter.
FIG. 2E depicts a preview consistent with implementations of the current subject matter.

In some implementations of the current subject matter, the key map 230 can be used to limit the key-value pairs that are aggregated by the second work node 120B to form a second intermediate result 220B shown in FIG. 2D. For example, based on the key map 230, the second worker node 120B can include the second key-value pair $(k_1, v_2)$ and the fifth key-value pair $(k_2, v_5)$ in the second intermediate result 220B because the first key $k_1$ and the second key $k_2$ are both present in the key map 230. However, the sixth key-value pair $(k_3, v_6)$ can be excluded from the second intermediate result 220B because the third key $k_3$ is not present in the key map 230.

The merger node 110 can generate a preview 240 as shown in FIG. 2E. The preview 240 can be generated by at least merging the first intermediate result 220A from the first worker node 120A and the second intermediate result 220B from the second worker node 120B. In some implementations of the current subject matter, the merger node 110 can merge the first intermediate result 220A and the second intermediate result 220B by adding both intermediate results to a preview. Specifically, the merge node 110 can add the first intermediate result 220A to the preview 240 before adding the second intermediate result 220B.

When the merge node 110 adds the second intermediate result 220B to the preview 240, the merger node 110 can merge the second key-value pair $(k_1, v_2)$ and the eighth key-value pair $(k_1, v_{1,3})$ to form a ninth key-value pair $(k_1, v_{1,2,3})$, where the value $v_{1,2,3}$ can be formed by merging (e.g., by applying one or more mathematical operations) the second value $v_2$ with the value $v_{1,3}$. Similarly, the merger node 110 can also merge the fourth key-value pair $(k_2, v_4)$ with the fifth key-value pair $(k_2, v_5)$ to form a tenth key-value pair $(k_2, v_{4,5})$, wherein the value $v_{4,5}$ can be formed by merging (e.g., by applying one or more mathematical operations) the fourth value $v_4$ and the fifth value $v_5$. It should be appreciated that a single set of intermediate results, such as the first intermediate result 220A and/or the second intermediate result 22B, may include the k number of key-value pairs and/or more than the k number of key-value pairs required for the preview. Alternately and/or additionally, merging two or more sets of intermediate results may yield more than the k number of key-value pairs required for the preview. In these scenarios, the merge node 110 may discard key-value pairs in excess of the k number of key-value pairs required for the preview.

Figure 3A:
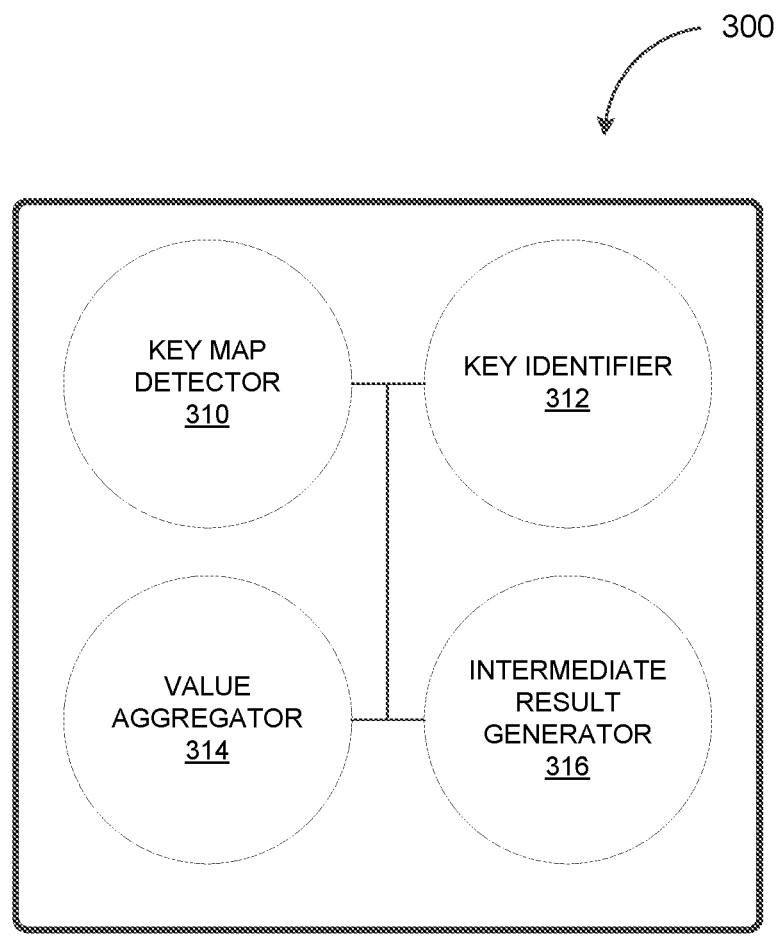
FIG. 3A depicts a block diagram illustrating a worker node consistent with implementations of the current subject matter.

FIG. 3A depicts a block diagram illustrating a worker node 300 consistent with implementations of the current subject matter. Referring to FIGS. 1, 2A-E, and 3A, the worker node 300 can implement the first worker node 120A and/or the second worker node 120B. As shown in FIG. 3A, the worker node 300 can include a key map detector 310, a key identifier 312, a value aggregator 314, and an intermediate result generator 316. It should be appreciated that the worker node 300 can include additional and/or different modules than shown.

In some implementations of the current subject matter, the key map detector 310 can be configured to determine if a key map, such as the key map 230, is available. The worker node 300 can process a data chunk by at least aggregating key-value pairs from the data chunk to form an intermediate result. For example, the worker node 300 can aggregate key-value pairs from the first data chunk 210A to form the first intermediate result 220A. Alternately and/or additionally, the worker node 300 can aggregate key-value pairs from the second data chunk 210B to form the second intermediate result 220B.

According to some implementations of the current subject matter, if the key map detector 310 determines that a key map is available, the key-value pairs that can be added to the intermediate result can be limited based on the key map. Alternately and/or additionally, if the key map detector 310 determines that a key map is not available, the worker node 300 can include every key-value pair in the data chunk in the intermediate result.

The key identifier 312 can be configured to determine, based on the key associated with a key-value pair, whether to add the key-value pair to the intermediate results. In instances where the key map detector 310 determines that a key map is available, the key identifier 312 can determine whether the key associated with a key-value pair is present in the key map. The intermediate result generator 316 can add the key-value pair to the intermediate result if the key identifier 312 determines that the key associated with the key-value pair is present in the key map. For example, the key identifier 312 can determine whether the first key $k_1$ of the first key-value pair $(k_1, v_1)$ is present in the key map 230. In the event that the key identifier 312 determines that the first key $k_1$ is present in the key map 230, the intermediate result generator 316 can add the first key-value pair $(k_1, v_1)$ to the first intermediate result 220A.

Furthermore, when a key-value pair is to be added to the intermediate result, the key identifier 312 can be further configured to determine whether the key-value pair has a same key as another key-value pair already present in the intermediate result. When the key associated with the key-value pair is already present as part of another key-value pair in the intermediate result, the value aggregator 314 can be configured to aggregate the two key-value pairs while the intermediate result generator 316 can add the aggregate of the two key-value pairs to the intermediate result. For example, after the first key-value pair $(k_1, v_1)$ is already added to the first intermediate result 220A, the key identifier 312 can determine whether the first key $k_1$ of the third key-value pair $(k_1, v_3)$ is present in the first intermediate result 220A. If the key identifier 312 determines that the first key $k_1$ is present in the first intermediate result 220A, the value aggregator 314 can aggregate the third key-value pair $(k_1, v_3)$ and the first key-value pair $(k_1, v_1)$. For instance, the value aggregator 314 can aggregate third key-value pair $(k_1, v_3)$ and the first key-value pair $(k_1, v_1)$ by at least aggregating the first value $v_1$ and the third value $v_3$. Meanwhile, the intermediate result generator 216 can add the resulting eighth key-value pair $(k_1, v_{1,3})$ to the first intermediate result 220A.

Figure 3B:
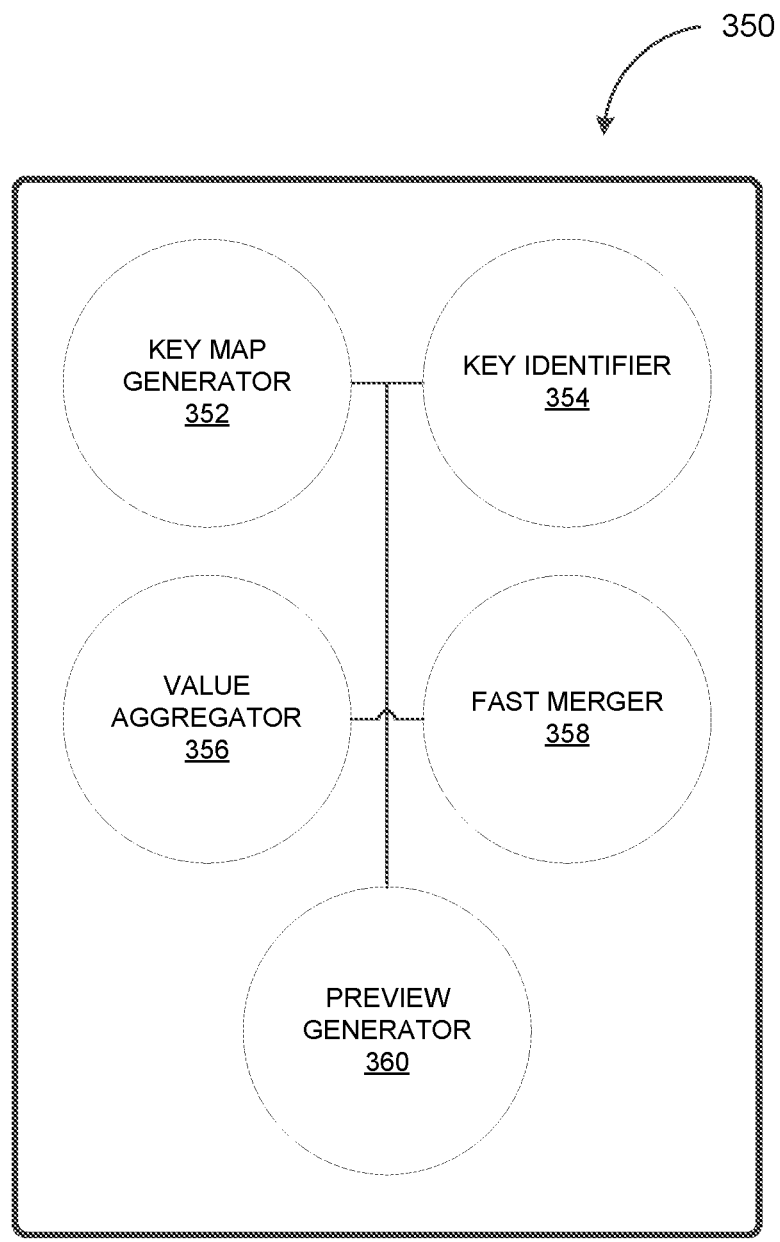
FIG. 3B depicts a block diagram illustrating a merger node consistent with implementations of the current subject matter.

FIG. 3B depicts a block diagram illustrating a merger node 350 consistent with implementations of the current subject matter. Referring to FIGS. 1, 2A-E, and 3B, the merger node 350 can implement the merger node 110. As shown in FIG. 3B, the merger node 350 can include a key map generator 352, a key identifier 354, a value aggregator 356, a fast merger 358, and a preview generator 360. It should be appreciated that the merger node 350 can include additional and/or different modules than shown.

In some implementations of the current subject matter, the key map generator 352 can be configured to generate a key map such as, for example, the key map 230. The key map generator 352 can generate the key map when the merger node 350 has received a sufficient number of key-value pairs from the worker nodes. For example, a preview for processing a dataset can include a k number of key-value pairs. As such, the key map generator 352 can generate a key map when the merger node 350 has received the k number of key-value pairs.

In some implementations of the current subject matter, the merger node 350 can merge intermediate results from different worker nodes to form a preview such as, for example, the preview 240. For example, the merger node 350 can add the first intermediate result 220A from the first worker node 120A to a preview before adding the second intermediate result 220B from the second worker node 120B. When the merger node 350 is adding the second intermediate result 220B to the preview 240, the key identifier 354 can determine whether the keys from the second intermediate result 220B are a match for any of the keys already present in the preview 240.

To further illustrate, the key identifier 354 can identify the first key $k_1$ from the second key-value pair $(k_1, v_2)$ as being present in the eighth key-value pair $(k_1, v_{1,3})$ in the preview 240. As such, the value aggregator 356 can aggregate the second key-value pair $(k_1, v_2)$ and the eighth key-value pair $(k_1, v_{1,3})$ to form a ninth key-value pair $(k_1, v_{1,2,3})$, where the value $v_{1,2,3}$ can be formed by merging (e.g., by applying one or more mathematical operations) the second value $v_2$ with the value $v_{1,3}$. Similarly, the key identifier 254 can determine that the second key $k_2$ from the fourth key-value pair $(k_2, v_4)$ is already present in the fifth key-value pair $(k_2, v_5)$ in the preview 240. Here, the value aggregator 256 can merge the fourth key-value pair $(k_2, v_4)$ with the fifth key-value pair $(k_2, v_5)$ to form a tenth key-value pair $(k_2, v_{4,5})$, wherein the value $v_{4,5}$ can be formed by merging (e.g., by applying one or more mathematical operations) the fourth value $v_4$ and the fifth value $v_5$.

Alternately and/or additionally, in instances where an intermediate result is formed based on a key map, the fast merger 358 can add the intermediate result to a preview without any matching of keys. It should be appreciated that applying the key map can impose a specific order to the key-value pairs in the intermediate result. That is, key-value pairs from different intermediate results can conform to the same order if the intermediate results are generated based on a same key map. Moreover, the ordering of key-value pairs in the preview can also conform to the order of the keys in the key map. This order that is present in an intermediate result generated based on a key map obviates the matching of keys when the intermediate results are added to the preview.

In some implementations of the current subject matter, the preview generator 360 can generate the preview 240. For example, the preview generator 360 can generate the preview 240 based on the merging of the first intermediate result 220A from the first worker node 120A and the second intermediate result 220B from the second worker node 120B. The preview 240 can include some but not all of the key-value pairs that would be present in a full result set. For instance, the preview 240 can include key-value pairs for the first key $k_1$ and the second key $k_2$. However, a key-value pair for the third key $k_3$ can be omitted from the preview 240 because the preview 240 is configured to include only two key-value pairs.

Figure 4A:
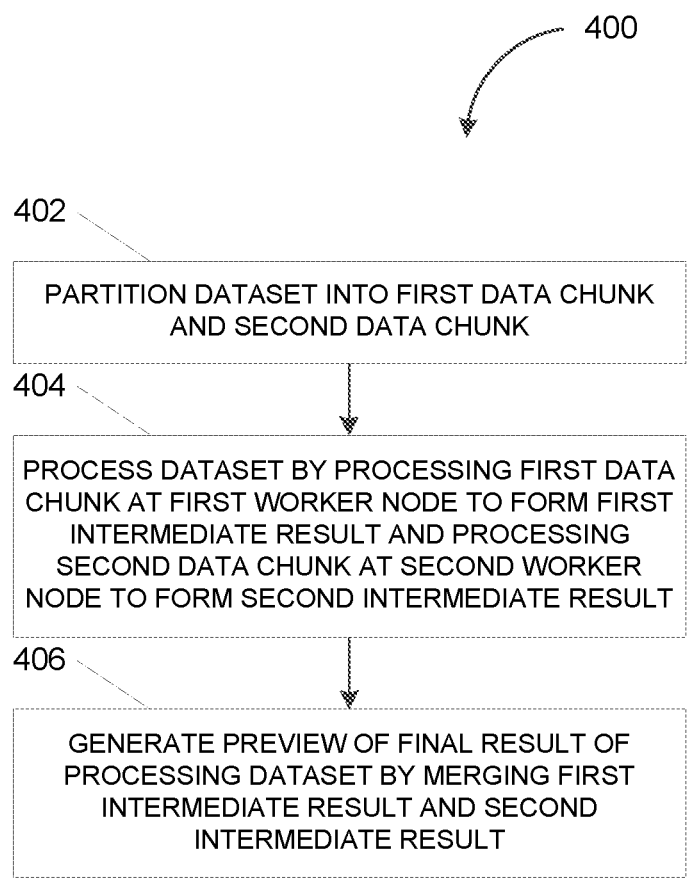
FIG. 4A depicts a flowchart illustrating a process for aggregating preview data consistent with implementations of the current subject matter.

FIG. 4A depicts a flowchart illustrating a process 400 for aggregating preview data consistent with implementations of the current subject matter. Referring to FIGS. 1-4A, the process 400 can be performed by the distributed computing system 100.

The distributed computing system 100 can partition a dataset into a first data chunk and a second data chunk (402).

For example, a dataset can be partitioned into the first data chunk 210A and the second data chunk 210B.

The distributed computing system 100 can process the dataset by processing the first data chunk at a first worker node to form a first intermediate result and processing a second data chunk at a second worker node to form a second intermediate result (404). For example, the first worker node 120A can process the first data chunk 210A to form the first intermediate result 220A while the second worker node 120B can process the second data chunk 210B to form the second intermediate result 220B. In some implementations of the current subject matter, the distributed computing system 100 can generate the key map 230 based at least on the first intermediate result 220A from the first worker node 120A. The key map 230 can be used to limit the key-value pairs that are aggregated by the second worker node 120B to generate the second intermediate result 220B.

The distributed computing system 100 can generate a preview of a final result of processing the dataset by merging at least a portion of the first intermediate result and the second intermediate result (406). For example, the merger node 110 can generate the preview 240 by at least merging the first intermediate result 220A from the first worker node 120A and the second intermediate result 220B from the second worker node 120B. The preview 240 can include a k number of key-value pairs, which can be some but not all of the key-value pairs that would be present in a full final result for processing the dataset. Referring again to FIG. 2E, the preview 240 can include key-value pairs for the first key $k_1$ and the second key $k_2$ but omit a key-value pair for the third key $k_3$ because the preview 240 is configured to include only two key-value pairs (e.g., k=2).

Figure 4B:
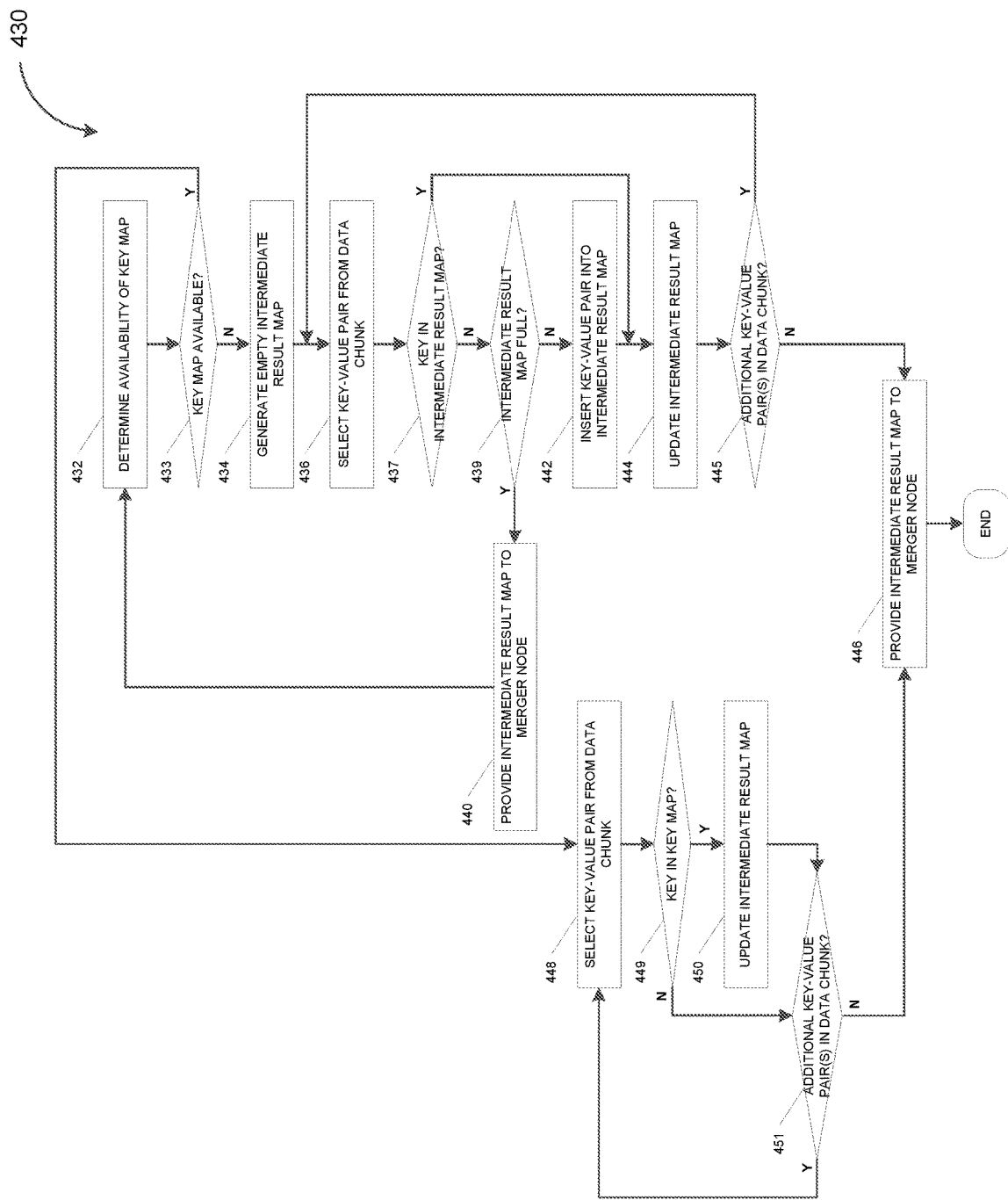
FIG. 4B depicts a flowchart illustrating a process for determining an intermediate result consistent with implementations of the current subject matter.

FIG. 4B depicts a flowchart illustrating a process 430 for determining an intermediate result consistent with implementations of the current subject matter. Referring to FIGS. 1-4B, the process 430 can be performed by a worker node within the distributed computing system 100 such as, for example, the worker node 300, the first worker node 120A, and/or the second worker node 120B. The process 430 can implement operation 404 of the process 400.

The worker node 300 can determine the availability of a key map (432). For example, the worker node 300 can determine whether the key map 230 is available. The key map 230 can be available when the merger node 350 collects, from the worker node 300 and/or another worker node, a sufficient number of key-value pairs for generating the preview 240. For instance, if the preview 240 is configured to include two key-value pairs (e.g., k=2), the merger node 350 can generate the key map 230 once the merger node 350 collects at least two key-value pairs from the worker node 300 and/or another worker node.

The worker node 300 can determine that a key map is not available (433-N). As such, the worker node 300 can generate an empty intermediate result map (434). For example, the worker node 300 can instantiate the first intermediate result 220A as an empty intermediate result map. The worker node 300 can further select a key-value pair from a data chunk (436). For instance, the worker node 300 can select the first key-value pair $(k_1, v_1)$ from the first data chunk 210A.

The worker node 300 can determine whether the key associated with the key-value pair is present in the intermediate result map (437). For example, the worker node 300 can determine whether the first key $k_1$ is already present in the first intermediate result 220A. If the worker node 300 determines that the key is not present in the intermediate result map (437-N), the worker node 300 can further determine if the intermediate result map is full (439). Here, if the worker node 300 determines that the intermediate result map is full (439-Y), the worker node 300 can provide the intermediate result map to a merger node (440). For example, if the worker node 300 determines that the first key $k_1$ is not in the first intermediate result 220A but the first intermediate result 220A is already full, the worker node 300 can provide the first intermediate result 220A to the merger node 350, thereby enabling the first intermediate result 220A to be merged with other intermediate results such as, for example, the second intermediate result 220B. Here, the process 430 can continue at operation 432 where the worker node 300 again determines the availability of a key map.

Alternately and/or additionally, the worker node 300 can determine that the intermediate result map is not full (439-N). As such, the worker node 300 can insert the key-value pair into the intermediate result map (442) and update the intermediate result map (444). For example, the worker node 300 can determine that the first key $k_1$ is not in the first intermediate result 220A and that the first intermediate result 220A is not already full. Thus, the worker node 300 can add the first key-value pair $(k_1, v_1)$ to the first intermediate result 220A. Moreover, the worker node 300 can determine whether there are one or more additional key-value pairs remaining in the data chunk (445). If the worker node 300 determines that there are one or more additional key-value pairs remaining in the data chunk (445-Y), the process 430 can continue at operation 436 where the worker node 300 selects a key-value pair from the data chunk. By contrast, if the worker node 300 determines that there are no more additional key-value pairs remaining in the data chunk (445-N), the worker node 300 can provide the intermediate result map to a merger node (446).

If the worker node 300 determines that the key is present in the intermediate result map (437-Y), the worker node 300 can update the intermediate result map (444). For example, the worker node 300 can attempt to add the third key-value pair $(k_1, v_3)$ to the first intermediate result 220A subsequent to adding the first key-value pair $(k_1, v_1)$. Here, the worker node 300 can determine that the first key $k_1$ is already present in the first intermediate result 220A. As such, the worker node 300 can update the first intermediate result 220A by at least aggregating the first key-value pair $(k_1, v_1)$ and the third key-value pair $(k_1, v_3)$. The worker node 330 can aggregate the first key-value pair $(k_1, v_1)$ and the third key-value pair $(k_1, v_3)$ by at least aggregating, via one or more mathematical operations, the first value $v_1$ and the third value $v_3$ to form the eighth key-value pair $(k_1, v_{1,3})$. The worker node 300 update the intermediate result map at operation 444 and determine whether there are one or more additional key-value pairs remaining in the data chunk (445). If the worker node 300 determines that there are one or more additional key-value pairs remaining in the data chunk (445-Y), the process 430 can continue at operation 436 where the worker node 300 selects a key-value pair from the data chunk. By contrast, if the worker node 300 determines that there are no more additional key-value pairs remaining in the data chunk (445-N), the worker node 300 can provide the intermediate result map to a merger node (446).

While the worker node 300 can add every key-value pair to an intermediate result map in the absence of a key map, the worker node 300 can limit the key-value pairs that are added to the intermediate result based on the key map when a key map is available. As such, in some implementations of the current subject matter, the worker node 300 can determine that a key map is available (433-Y). The worker node 300 can select a key-value pair from the data chunk and determine whether the key associated with that key-value pair is present in the key map (449). If the worker node 300 determines that the key is present in the key map (449-Y), the worker node 300 can update the intermediate result map (450). Alternately and/or additionally, if the worker node 300 determines that the key is not present in the key map (449-N), the worker node 300 can skip over that key value pair and determine whether one or more additional key-value pairs remain in the data chunk (451). If the worker node 300 determines that there are one or more additional key-value pairs remaining in the data chunk (451-Y), the worker node 300 can select a key-value pair from the data chunk (448) and continue to determine whether to add the key-value pair to the intermediate result map based on the key map. By contrast, if the worker node 300 determines that there are no additional key-value pairs remaining in the data chunk (451-N), the worker node 300 can provide the intermediate result map to the merger node (448).

For example, the worker node 300 can determine that the key map 230 is available. The worker node 300 can select the first key-value pair $(k_1, v_1)$ from the first data chunk 210A and determine whether the first key $k_1$ is in the key map 230. Since the first key $k_1$ is in the key map 230, the worker node 300 can update the first intermediate result 220A by at least adding the first key-value pair $(k_1, v_1)$. Similarly, the worker node 300 can select the third key-value pair $(k_1, v_3)$ from the first data chunk 210A and determine whether the first key $k_1$ is in the key map 230. Since the first key $k_1$ is in the key map 230, the worker node 300 can update the first intermediate result 220A by at least adding the third key-value pair $(k_1, v_3)$. Here, the worker node 300 can add the third key-value pair $(k_1, v_3)$ by at least aggregating the third key-value pair $(k_1, v_3)$ with the first key-value pair $(k_1, v_1)$ that is already in the first intermediate result 220A. However, when the worker node 300 selects the seventh key-value pair $(k_3, v_7)$ from the first data chunk 210A, the worker node 300 can determine that the third key $k_3$ is not part of the key map 230. As such, the worker node 300 can avoid adding the seventh key-value pair $(k_3, v_7)$ to the first intermediate result 220A. It should be appreciated that once the worker node 300 processes every key-value pair in the first data chunk 210A, the worker node 300 can provide the first intermediate result 220A to the merger node 350 where the merger node 350 can merge the first intermediate result 220A with other intermediate results such as, for example, the second intermediate result 220B.

Figure 4C:
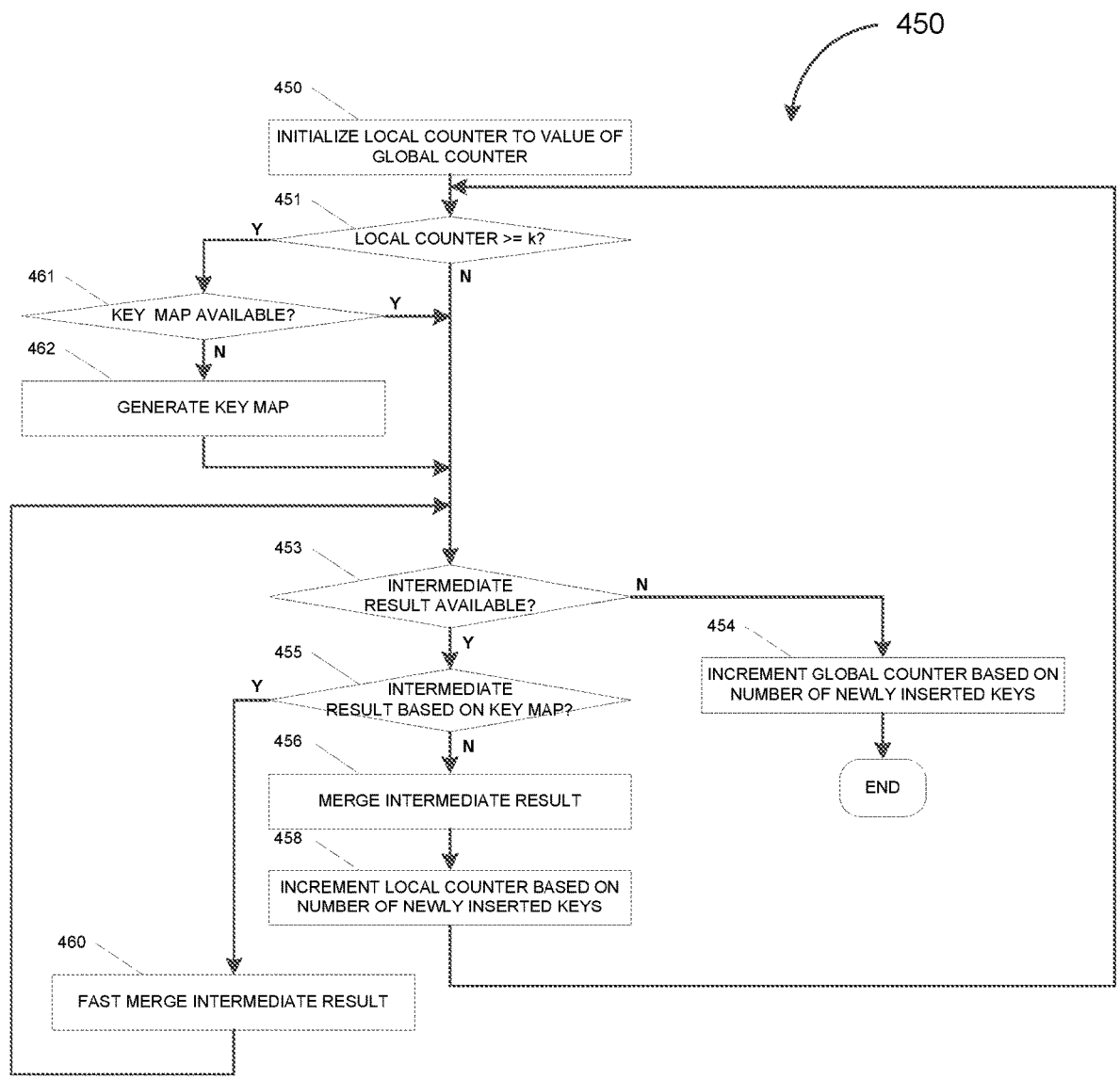
FIG. 4C depicts a flowchart illustrating a process for merging intermediate results consistent with implementations of the current subject matter.

FIG. 4C depicts a flowchart illustrating a process 450 for merging intermediate results consistent with implementations of the current subject matter. Referring to FIGS. 1-4C, the process 450 can be performed by a merger node within the distributed computing system 100 such as, for example, the merger node 350 and/or the merger node 110. The process 450 can implement operation 406 of the process 400.

The merger node 350 can initialize a local counter at the merger node 350 to a value of a global counter associated with the distributed computing system 100 (450). In some implementations of the current subject matter, a global counter and one or more local counters can be used to track when one or more merger nodes (e.g., the merger node 350) have merged a sufficient number of key-value pairs for a preview. For example, a preview can be configured to include a k number of key-value pairs. As such, the global counter and the local counters can be configured to enable a determination of when the k number of key-value pairs have been merged by the merger 350 and/or one or more other merger nodes.

The merger node 350 can determine whether the local counter equal to or exceeds a threshold value (451). For example, the merger node 350 can determine whether the local counter exceeds the k number of key-value pairs required for the preview 240. If the merger node 350 determines that the local counter does not exceed the threshold value (451-N), the merger node 350 can determine whether an intermediate result from a worker node is available (453). For example, the merger node 350 can determine whether the worker node 300 has provided an intermediate result (e.g., the first intermediate result 220A and/or the second intermediate result 220B) that has not already been merged by another merger node 350.

If the merger node 350 determines that no intermediate result is available from a worker node (453-N), the merger node 350 can increment the global counter based on the number of newly inserted keys (454) and the process 450 can terminate. For example, if there are no more intermediate results to be merged into the preview 240, the merger node 350 can increment the global counter to reflect the number of unique keys that have been added to the preview 240.

In some implementations of the current subject matter, the merger node 350 can determine that an intermediate result from a worker node is available (453-Y). As such, the merger node 350 can further determine whether that intermediate result is generated based on a key map (455). If the merger node 350 determines that the intermediate result is generated based on a key map (455-Y), the merger node 350 can fast merge the intermediate result (460). It should be appreciated that generating an intermediate result based on a key map imposes an order to the key-value pairs included in the intermediate result. For example, if the second intermediate result 220B is generated based on the key map 230, the ordering of the key-value pairs within the second intermediate result 220B would conform to the ordering of the keys in the key map 230. Meanwhile, the ordering of the key-value pairs in the preview 240 can also conform to the ordering of the keys in the key map 230. Thus, if the second intermediate result 220B is generated based on the key map 230, the merger node 350 can merge the first key-value pair in the second intermediate result 220B with the first key-value pair in the preview 240 without first matching the keys that are associated with these key-value pairs.

By contrast, if the merger node 350 determines that the intermediate result is not generated based on a key map (455-N), the merger node 350 can merge the intermediate result (456). For example, if the merger node 350 determines that the first intermediate result 220A is not generated based on the key map 230, the merger node 350 can merge the first intermediate result 220A into the preview 240 by at least matching the keys that are present in the first intermediate result 220A with the keys that are present in the preview 240. The merger node 350 can, for example, select the key-value pair $(k_1, v_{1,3})$ from the first intermediate result 220A and identify a key-value pair in the preview 240 having the same first key $k_1$. The merger node 350 can merge a key-value pair from the first intermediate result 220A with a key-value pair from the preview 240 when the two key-value pairs have matching keys.

When the merger node 350 merges the intermediate result at operation 456, the merger node 350 can increment the local counter based on a number of newly inserted keys (458). The process 450 can continue at operation 451 where the merger node 350 determines whether the local counter exceeds the threshold value.

In some implementations of the current subject matter, the merger node 350 can determine that the local counter exceeds the threshold number (451-Y). When the local counter exceeds the threshold value, the merger node 350 can determine that a sufficient number of key-value pairs have been merged for generating the preview 240. As such, the merger node 350 can determine whether a key map is already available (461). If the merger node 350 determines that a key map is already available (461-Y), the process 450 can continue at operation 453 where the merger node 350 determines if additional intermediate results are available. For example, the merger node 350 can determine that the key map 230 has already been generated by the merger node 350 and/or another merger node. As such, the merger node 350 can determine whether additional intermediate results are available to be merged into the preview. Alternately and/or additionally, if the merger node 350 determines that a key map is not available (461-N), merger node 350 can generate the key map. For example, when the merger node 350 determines that the key map 230 is not yet available, the merger node 350 can generate the key map 230. The merger node 350 can generate the key map 230 to include keys (e.g., the first key $k_1$ and the second key $k_2$) that have been added to the preview. As noted earlier, adding a key to the key map indicates to a worker node which key-value pairs to aggregate when generating an intermediate result at the worker node.

Figure 5:
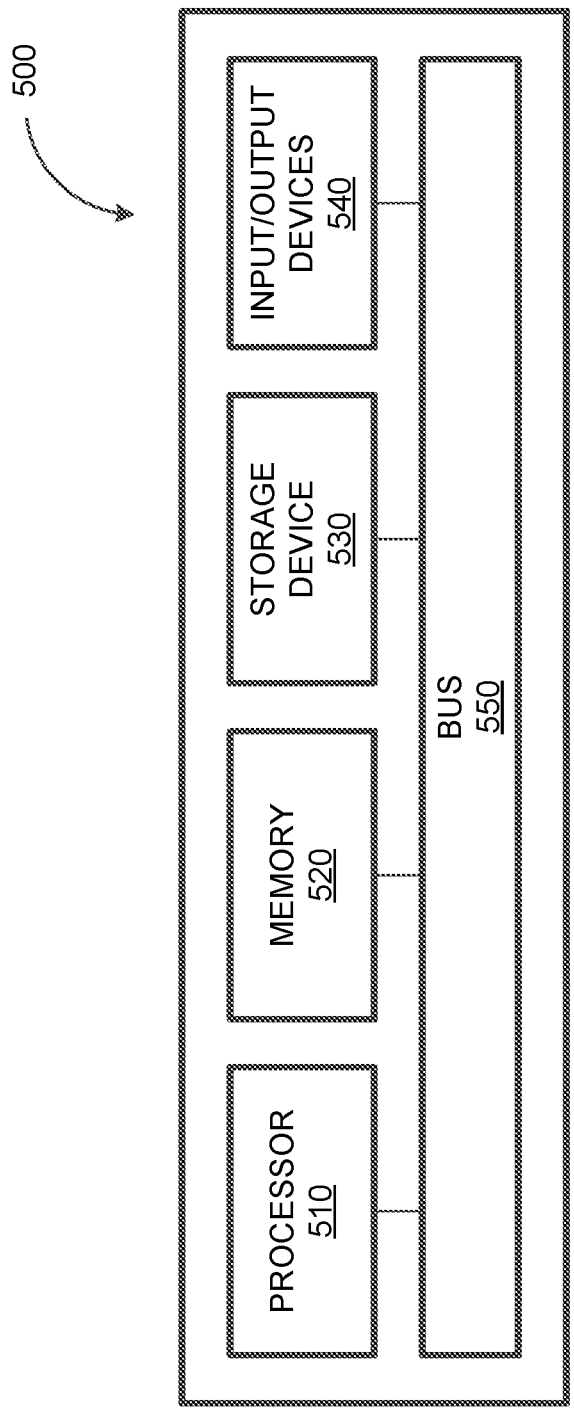
FIG. 5 depicts a block diagram illustrating a computing system consistent with implementations of the current subject matter.

FIG. 5 depicts a block diagram illustrating a computing system 500 consistent with implementations of the current subject matter. Referring to FIGS. 1 and 5, the computing system 500 can be used to implement the merger node 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the merger node 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows can include different and/or additional operations than shown without departing from the scope of the present disclosure. One or more operations of the logic flows can be repeated and/or omitted without departing from the scope of the present disclosure. Other implementations can be within the scope of the following claims.

What is claimed is:

1. A computer implemented method, comprising:
    processing, at a first worker node, a first data chunk of a dataset to generate a first intermediate result, the processing of the first data chunk comprising inserting a first plurality of key-value pairs from the first data chunk into the first intermediate result, the dataset being partitioned into the first data chunk and a second data chunk;
    generating, at a merger node, a key map based at least on a determination that a quantity of the first plurality of key-value pairs in the first intermediate result exceeds a threshold value, the key map being generated to include one or more keys of the key-value pairs in the first intermediate result;
    processing, at a second worker node, the second data chunk to generate a second intermediate result, the processing of the second data chunk includes inserting, into the second intermediate result, a first key-value pair and a second key-value pair based at least on a first key associated with the first key-value pair and a second key associated with the second key-value pair being present in the key map, the processing of the second data chunk further includes omitting, from the second intermediate result, a third key-value pair based at least on a third key associated with the third key-value pair being absent from the key map, the first key-value pair and the second key-value pair being inserted in a same order as an order of the first key and the second key in the key map; and
    generating a preview of the processing of the dataset, the preview being generated by at least merging the first intermediate result and the second intermediate result without identifying one or more key-value pairs from each of the first intermediate result and the second intermediate result that share a same key.

2. The computer-implemented method of claim 1, wherein the threshold value corresponds to a quantity of key-value pairs required to be present in the preview.

3. The computer-implemented method of claim 1, wherein the inserting of the key-value pairs from the first data chunk into the first intermediate result comprises:
    selecting a fourth key-value pair from the first data chunk; and
    determining whether the first key-value pair is associated with a same key as a fifth key-value pair in the first intermediate result.

4. The computer-implemented method of claim 3, further comprising:
    aggregating the fourth key-value pair and the fifth key-value pair based at least in part on a determination that the fourth key-value pair and the fifth key-value pair are associated with the same key.

5. The computer-implemented method of claim 4, wherein the aggregating comprises aggregating a first value of the fourth key-value pair and a second value of the fifth key-value pair, and wherein the first value and the second value are aggregated by addition, multiplication, division, subtraction, and/or comparison.

6. The computer-implemented method of claim 1, wherein the first intermediate result and the second intermediate result are merged without determining whether a fourth key-value pair from the first intermediate result shares a same key as the first key-value pair or the second key-value pair from the second intermediate result.

7. The computer-implemented method of claim 1, wherein the preview is further generated by merging, with the first intermediate result and/or the second intermediate result, a third intermediate result generated based on the key map.

8. A system, comprising:
    at least one data processor; and
    at least one memory storing instructions which, when executed by the at least one data processor, result in operations comprising:
        processing, at a first worker node, a first data chunk of a dataset to generate a first intermediate result, the processing of the first data chunk comprising inserting a first plurality of key-value pairs from the first data chunk into the first intermediate result, the dataset being partitioned into the first data chunk and a second data chunk;
        generating, at a merger node, a key map based at least on a determination that a quantity of the first plurality of key-value pairs in the first intermediate result exceeds a threshold value, the key map being generated to include one or more keys of the key-value pairs in the first intermediate result;

processing, at a second worker node, the second data chunk to generate a second intermediate result, the processing of the second data chunk includes inserting, into the second intermediate result, a first key-value pair and a second key-value pair based at least on a first key associated with the first key-value pair and a second key associated with the second key-value pair being present in the key map, the processing of the second data chunk further includes omitting, from the second intermediate result, a third key-value pair based at least on a third key associated with the third key-value pair being absent from the key map, the first key-value pair and the second key-value pair being inserted in a same order as an order of the first key and the second key in the key map; and generating a preview of the processing of the dataset, the preview being generated by at least merging the first intermediate result and the second intermediate result without identifying one or more key-value pairs from each of the first intermediate result and the second intermediate result that share a same key.

9. The system of claim 8, wherein the threshold value corresponds to a quantity of key-value pairs required to be present in the preview.

10. The system of claim 8, wherein the inserting of the key-value pairs from the first data chunk into the first intermediate result comprises:

selecting a fourth key-value pair from the first data chunk; and determining whether the first key-value pair is associated with a same key as a fifth key-value pair in the first intermediate result; and aggregating the fourth key-value pair and the fifth key-value pair based at least in part on a determination that the fourth key-value pair and the fifth key-value pair are associated with the same key.

11. The system of claim 10, wherein the aggregating comprises aggregating a first value of the fourth key-value pair and a second value of the fifth key-value pair, and wherein the first value and the second value are aggregated by addition, multiplication, division, subtraction, and/or comparison.

12. The system of claim 8, wherein the first intermediate result and the second intermediate result are merged without determining whether a fourth key-value pair from the first intermediate result shares a same key as the first key-value pair or the second key-value pair from the second intermediate result.

13. The system of claim 8, wherein the preview is further generated by merging, with the first intermediate result and/or the second intermediate result, a third intermediate result generated based on the key map.

14. A non-transitory computer-readable storage medium including program code, which when executed by at least one data processor, cause operations comprising:

processing, at a first worker node, a first data chunk of a dataset to generate a first intermediate result, the processing of the first data chunk comprising inserting a first plurality of key-value pairs from the first data chunk into the first intermediate result, the dataset being partitioned into the first data chunk and a second data chunk;

generating, at a merger node, a key map based at least on a determination that a quantity of the first plurality of key-value pairs in the first intermediate result exceeds a threshold value, the key map being generated to include one or more keys of the key-value pairs in the first intermediate result;

processing, at a second worker node, the second data chunk to generate a second intermediate result, the processing of the second data chunk includes inserting, into the second intermediate result, a first key-value pair and a second key-value pair based at least on a first key associated with the first key-value pair and a second key associated with the second key-value pair being present in the key map, the processing of the second data chunk further includes omitting, from the second intermediate result, a third key-value pair based at least on a third key associated with the third key-value pair being absent from the key map, the first key-value pair and the second key-value pair being inserted in a same order as an order of the first key and the second key in the key map; and generating a preview of the processing of the dataset, the preview being generated by at least merging the first intermediate result and the second intermediate result without identifying one or more key-value pairs from each of the first intermediate result and the second intermediate result that share a same key.

* * * * *